T. T. GRAY.
PROCESS OF TREATING HYDROCARBON OILS.
APPLICATION FILED DEC. 3, 1913.
1,158,205. Patented Oct. 26, 1915.
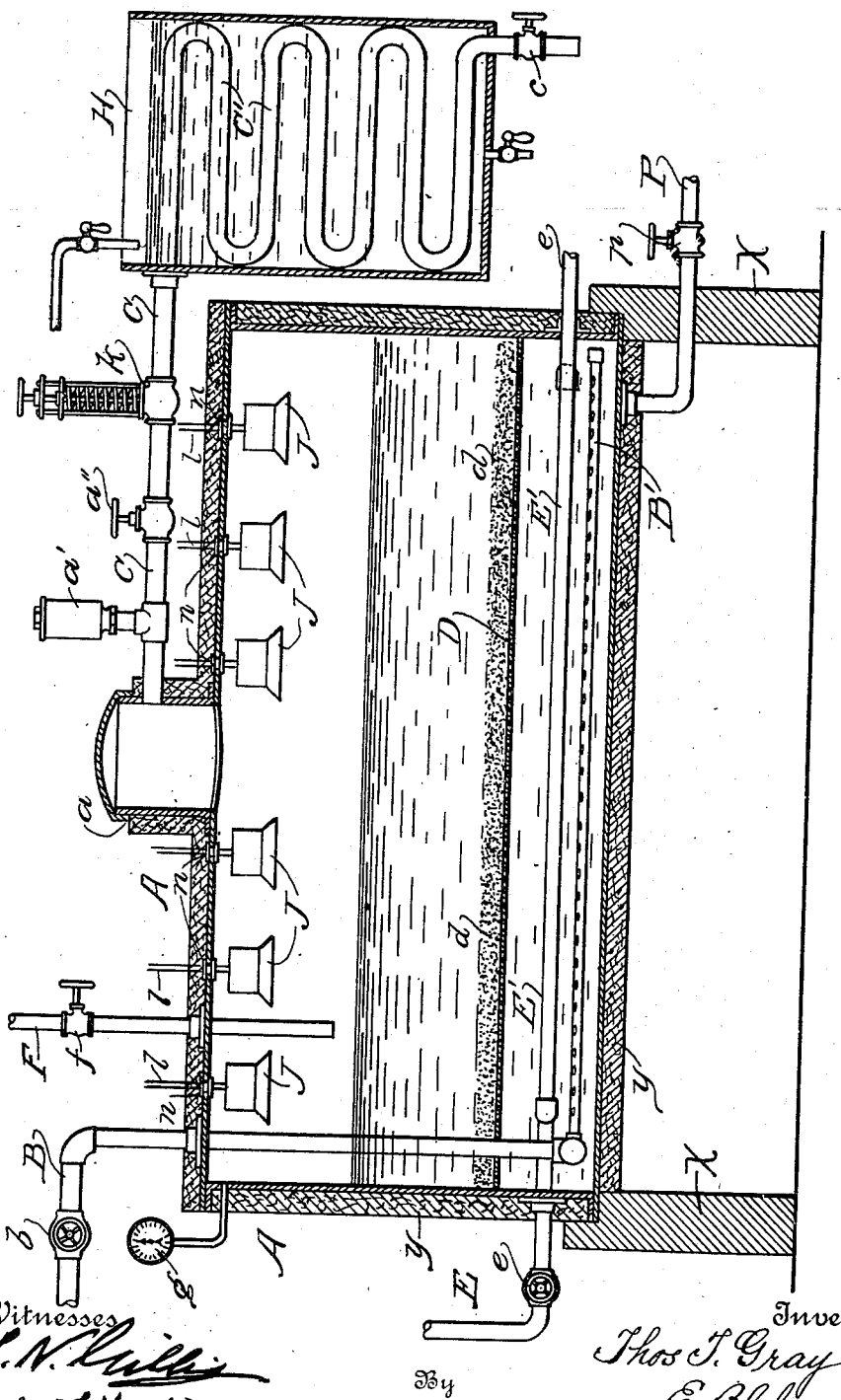

UNITED STATES PATENT OFFICE.

THOMAS T. GRAY, OF ELIZABETH, NEW JERSEY.

PROCESS OF TREATING HYDROCARBON-OILS.

1,158,205.

Specification of Letters Patent. Patented Oct. 26, 1915.

Application filed December 3, 1913. Serial No. 804,467.

*To all whom it may concern:*

Be it known that I, THOMAS T. GRAY, a citizen of the United States, residing at Elizabeth, in the county of Union and State of New Jersey, have invented certain new and useful Improvements in Processes of Treating Hydrocarbon-Oils, of which the following is a specification.

This invention relates to treating hydrocarbon oils, such as petroleum distillates and residues or distillates from other carbonaceous material, as lignite, shale, etc., and including paraffin wax, for improving the quality and obtaining useful products. The hydrocarbon oils now generally found in the market possess the quality of fluorescence. This quality is objectionable and the trade now demands hydrocarbon oils for certain purposes, especially lubricating oils, which are free from fluorescence. I have therefore devised a process of treating fluorescent oils which I term deblooming, and which results in completely removing the objectionable fluorescence.

I have discovered that when hydrocarbon oils are subjected to oxygenation as by currents of air, oxygen or an oxygen-carrying gas or vapor, in the presence, and under the influence of ultra violet light, the operation of deblooming will be most efficiently and rapidly effected. I have also discovered that these same active rays greatly accelerate the conversion of hydrocarbons,—when blown with an oxygen carrying gas or vapor, into fatty acids and organic esters. In carrying out my process, therefore, I suspend or place in the still or treating chamber a number of lamps giving ultra violet rays, so that such rays shall be directed at close range upon the body of oil being treated. For the purpose of oxygenating the oil, I may blow air or an oxygen carrying gas or vapor in numerous streams up through the body of oil. The process may in some cases be advantageously conducted under pressure of one to five atmospheres in the treating chamber or still. In case of rendering oils non-fluorescent a lower temperature may be used, from 50° to 120° C., depending upon the nature of the product being treated. For converting the hydrocarbons into fatty acids and esters, a higher temperature of 90° to 175° C. or 250° F. to 300° F. may be maintained in the still, according to the character of the hydrocarbons being treated and their susceptibility to oxygenation and esterification.

I have found that the process may be facilitated by carrying out the operations in the presence of catalytic agents or porous contact material consisting of metals, or finely divided or reduced metals, or their bases, or salts, or porous granular or absorbent materials, or porous, granular, or absorbent material carrying finely divided or reduced metals, their salts or bases. The catalytic agent or contact material may be carried in a layer on a perforated tray or grid in the still or treating chamber.

The matter constituting my invention will be defined in the claims.

Suitable apparatus for carrying out my process is illustrated in the accompanying drawing, which represents a vertical longitudinal section of the apparatus with parts in elevation.

A cylindrical form of still or treating chamber A is supported on a foundation X, and is preferably covered with non-conducting or insulating material $y$, since it is to be heated by an interior steam coil. The still is provided with the usual dome $a$, from which leads a vapor discharge pipe C to a condenser coil C' in a water tank H. To the vapor pipe may be applied a pop safety valve $a'$, a stop valve $a''$, and a pressure-controlling valve $k$, which may be set at any desired pressure for controlling the degree of pressure in the still. The discharge end of coil C' is provided with a valve $c$, and tank H is provided with valved water supply and drain pipes as shown. A pressure gage $g$ is preferably applied to the top of the still. An air supply pipe B, having a valve $b$, may lead from a compressor and extends down to near the bottom of the still where connection is made with one or more perforated distributing pipes B', extending longitudinally nearly the length of the still. A high pressure steam supply pipe E, having a valve $e$, extends through the wall of the still and connects with a heating coil E' located near the bottom but above the air-distributing pipe, and having an escape pipe $e'$ extending out through the wall of the still. An oil supply pipe F, having a valve $f$, extends down into the still. A draw-off pipe, P, having a valve $p$, may connect with the bottom of the still.

A horizontal perforated tray or grid D is located in the still at a suitable distance above the steam coil for supporting a layer of catalytic agent or contact material *d*. Two or more of such trays may be used if desired.

Any desired number of lamps J, giving ultra violet rays, are connected by electric conductors *l* passing through insulators *n* and suspended from the top of the still. In the position shown they will effectively shed their active rays upon the surface of the body of oil under treatment and perform their desired function in my process.

The oil to be treated is supplied through pipe F by a pump or other means, till a suitable body is formed as indicated in the drawing. In case paraffin wax is to be treated it may be first melted and then run into the still through pipe F. High pressure steam is admitted to the heating coil E', and the body of oil or melted paraffin wax heated to the desired temperature. The electric current is turned on to the lamps J. Air or other oxygen carrying gas or vapor will now be blown in numerous streams through the perforated pipe B, and such streams will agitate the oil, or melted paraffin wax, so that fresh portions of hydrocarbons will be continuously exposed to the active rays of the lamps. For the purpose of rendering the oil non-fluorescent a temperature is maintained from 50° to 120° C. The length of time required for treatment will depend upon the hydrocarbons being treated and their susceptibility to oxygenation. The process is continued until a sample drawn from the still shows the oil to be debloomed or made non-fluorescent; then the operation is complete and the contents may be drawn from the still. In case the hydrocarbon is to be converted into fatty acids and esters, the temperature must be raised to a suitable degree between 250° F. and 300° F., depending upon the character of the oil being treated and its susceptibility to oxygenation and esterification. The process will also be extended over a longer period of time than that required for removing fluorescence. I have been able by this process to convert seventy-five per cent. of a quantity of hydrocarbons into fatty acids. Samples taken from the still will show the progress being made in the production of fatty acids. I have demonstrated by numerous tests that the ultra violet rays of the lamps exercise a very beneficial influence in my process and greatly accelerate the deblooming and conversion of the hydrocarbons into fatty acids and esters, and also, in some cases, of bleaching the color of the oil.

The following is stated as a further illustration of how hydrocarbon oils or paraffin wax may be treated in order to remove fluorescence and to form fatty acids and organic esters: The oil or wax is contained in a receptacle, over which is placed a lamp giving the ultra violet light. The small tank receptacle may be either open or closed and contains a tight coil immersed in oil for heating or cooling; in case the oil is to be heated, steam is allowed to pass through the coil, and in case it is to be cooled water is passed through. The receptacle contains in addition, a perforated coil through which air, or oxygen, or ozone, or an oxygen-carrying gas vapor is passed to agitate the oil and at the same time to oxidize the compounds giving fluorescence. The lamp is placed as near to the oil as possible, allowing for the agitation; that is, the lamp is preferably placed within from two to six inches of the surface of the oil. The temperature for deblooming should not exceed 100° C., otherwise discoloration of the oil will be brought about, making the oil unfit for use without further refining by ordinary refining methods to remove this dark color. In case the temperature should rise above 100° C., water is passed through the coil until the thermometer reading shows lower than 100° C. As a rule the radiation of the lamp will give enough heat for this purpose. Working in this way with a lamp giving a voltage of 220, placed four inches from the surface of the oil, which was agitated gently with air or oxygen, in the case of air it required approximately eight hours to debloom a depth of three inches covering a surface one foot square per lamp. In case of a closed apparatus, there would naturally have to be a vent for air or oxygen relief. The process takes place quickly and is very apparent when samples are drawn off at the bottom and observed by reflected light.

In case of forming fatty acids or organic esters higher temperatures are necessary, and the process can be effectively carried out in the same apparatus. Deblooming takes place by this process and fatty acids and esters are formed. The ordinary working temperatures to bring about this reaction are preferably between 100° and 200° C. In order to find out the rate at which organic esters are formed, a sample is drawn off and the amount of unsaponifiable matter is determined as described in *Lewkowitsch*, 3rd edition, volume 1, page 293. The unsaponifiable matter will be the unacted upon oil or wax and alcohols and the saponifiable matter will be the difference and will illustrate the stage of the process. With practice, the determination of the saponification value as described in the same volume of *Lewkowitsch* cited above, page 226, will serve as an index of the extent to which the hydrocarbons have been converted into saponifiable matter or into fatty acids and organic esters. I have found it well, in order to preserve the color, to stop the process when the saponification value reaches 200. When the proper saponification value is reached the oil or wax is withdrawn from the apparatus. Enough air, or oxygen, or oxygen-carrying gas or vapor, including ozone, is used to agitate the oil or wax and bring fresh layers in contact with the ultra-violet rays.

Caustic soda or caustic potash are suitable catalytic agents, and may be used up to 20 per cent. of the weight of the oil. The catalytic agents in each case are placed in the bottom of the treating vessel or on a tray near the bottom.

Having described my invention, what I claim and desire to secure by Letters Patent, is:

1. The process of deblooming hydrocarbons and converting them into fatty acids and esters, which consists in subjecting them to an oxidizing agent in the presence of ultra violet or active rays.

2. The process of treating hydrocarbons for deblooming and forming fatty acids and esters, which consists in subjecting them to an oxidizing agent in a heated condition and in the presence of ultra violet or active rays.

3. The process of treating hydrocarbons for deblooming and forming fatty acids and esters, which consists in subjecting them to an oxidizing agent in the presence of ultra violet or active rays and in the presence of a catalytic or contact agent.

4. The process of treating hydrocarbons for deblooming and forming fatty acids and esters, which consists in subjecting them to an oxidizing agent in a heated condition in the presence of ultra violet or active rays, and of a catalytic or contact agent such as finely divided or reduced metals, their salts or bases, porous, granular or absorbent material, or such materials carrying finely divided or reduced metals, their bases or salts.

5. The process of treating hydrocarbons for deblooming and forming fatty acids and esters, which consists in subjecting them to pressure and an oxidizing agent in the presence of ultra violet or active rays.

6. The process of treating hydrocarbons for deblooming and forming fatty acids and esters, which consists in heating them and subjecting to pressure and an oxidizing agent in the presence of ultra violet or active rays.

7. The process of treating hydrocarbons for deblooming and forming fatty acids and esters, which consists in subjecting them to pressure and an oxidizing agent in the presence of ultra violet or active rays and in the presence of a catalytic or contact agent.

8. The process of treating hydrocarbons for deblooming and forming fatty acids and esters, which consists in subjecting the oil to pressure, blowing streams of air or an oxygen-carrying gas or vapor through them in the presence of ultra violet or active rays.

9. The process of treating hydrocarbons for deblooming and forming fatty acids and esters, which consists in heating them to the desired temperature, blowing streams of oxygen-carrying gas or vapor through the mass in the presence of ultra violet or active rays.

10. The process of treating hydrocarbons for deblooming and forming fatty acids and esters, which consists in heating them, blowing streams of oxygen-carrying gas or vapor through the mass in the presence of ultra violet or active rays and in the presence of a catalytic or contact agent.

11. The process of treating hydrocarbons for deblooming, and bleaching them which consists in subjecting them to an oxidizing agent in the presence of ultra-violet or active rays.

In testimony whereof I affix my signature in presence of two witnesses.

THOMAS T. GRAY.

Witnesses:
WALTER MILLER,
HARRY R. JOSTEN.